United States Patent
Otsuka

(10) Patent No.: US 7,532,716 B2
(45) Date of Patent: May 12, 2009

(54) COMMUNICATION SYSTEM, AND TERMINAL DEVICE AND COMMUNICATION DEVICE USED IN COMMUNICATION SYSTEM

(75) Inventor: Naoki Otsuka, Konan (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1013 days.

(21) Appl. No.: 10/422,858

(22) Filed: Apr. 25, 2003

(65) Prior Publication Data

US 2003/0203744 A1 Oct. 30, 2003

(30) Foreign Application Priority Data

Apr. 26, 2002 (JP) ............................. 2002-126651

(51) Int. Cl.
H04M 1/00 (2006.01)

(52) U.S. Cl. ................. 379/352; 379/93.01; 379/93.07; 379/106.01; 379/142.01; 379/142.14; 455/414.1; 455/420; 455/564; 709/208

(58) Field of Classification Search ............... 379/93.01, 379/93.07, 106.01, 142.01, 142.14, 352; 455/414.1, 420, 564; 709/208
See application file for complete search history.

(56) References Cited

U.S. PATENT DOCUMENTS

| | | | | | |
|---|---|---|---|---|---|
| 5,327,486 | A | * | 7/1994 | Wolff et al. | 379/93.23 |
| 5,327,487 | A | * | 7/1994 | Brown et al. | 379/100.17 |
| 5,440,627 | A | * | 8/1995 | Puri | 379/355.01 |
| 5,528,681 | A | * | 6/1996 | Iwai et al. | 379/355.05 |
| 5,787,152 | A | * | 7/1998 | Freadman | 379/88.01 |
| 6,308,062 | B1 | * | 10/2001 | Chien et al. | 455/420 |
| 6,366,653 | B1 | * | 4/2002 | Yeh et al. | 379/93.05 |
| 6,389,299 | B1 | * | 5/2002 | Park | 455/554.1 |
| 6,400,962 | B1 | * | 6/2002 | Yamada | 455/552.1 |
| 6,490,349 | B1 | * | 12/2002 | Garfinkel et al. | 379/265.02 |
| 6,792,103 | B1 | * | 9/2004 | Walker et al. | 379/352 |
| 6,856,817 | B2 | * | 2/2005 | Tischler | 455/569.1 |
| 6,980,641 | B1 | * | 12/2005 | Stanford et al. | 379/354 |
| 7,120,424 | B1 | * | 10/2006 | Coan et al. | 455/414.1 |
| 7,218,728 | B1 | * | 5/2007 | Nagasawa et al. | 379/387.01 |
| 2001/0014919 | A1 | * | 8/2001 | Tzirin | 709/328 |
| 2002/0159582 | A1 | * | 10/2002 | Dendy | 379/352 |
| 2003/0017854 | A1 | * | 1/2003 | Avitan | 455/564 |
| 2003/0076816 | A1 | * | 4/2003 | Naranjo et al. | 370/352 |

FOREIGN PATENT DOCUMENTS

| | | |
|---|---|---|
| JP | A 4-167855 | 6/1992 |
| JP | A 2000-106610 | 4/2000 |
| JP | A 2001-285448 | 10/2001 |
| JP | A 2002-111850 | 4/2002 |

* cited by examiner

Primary Examiner—Fan Tsang
Assistant Examiner—Hemant Patel
(74) Attorney, Agent, or Firm—Oliff & Berridge, PLC

(57) ABSTRACT

A system to enable access information stored on a terminal device (cellular phone) to be utilized without imposing a load on a user when performing communications from a communication device (MFP). An address book on the cellular phone is opened (S101, S102), and a name of a communication destination and the access information are selected by use of the address book (S103 to S105). vCard-formatted data is created based on the content selected (S108), and the created data is transmitted to the MFP (S109). The MFP analyzes the vCard-formatted data received from the cellular phone (S201, S202), and the communications are performed by use of the access information contained in the vCard-formatted data (S203 to S216).

22 Claims, 5 Drawing Sheets

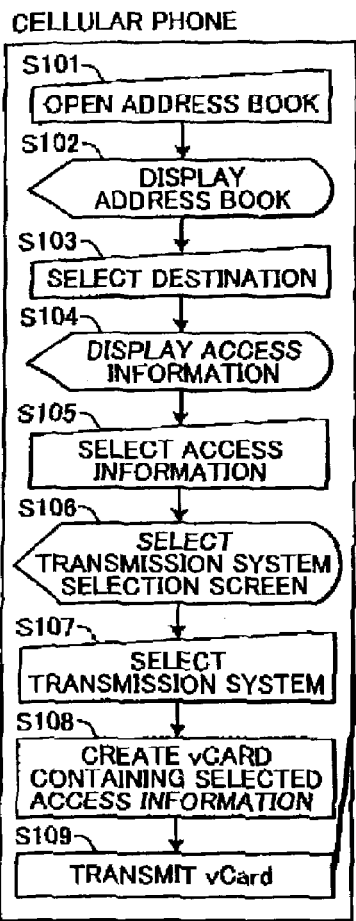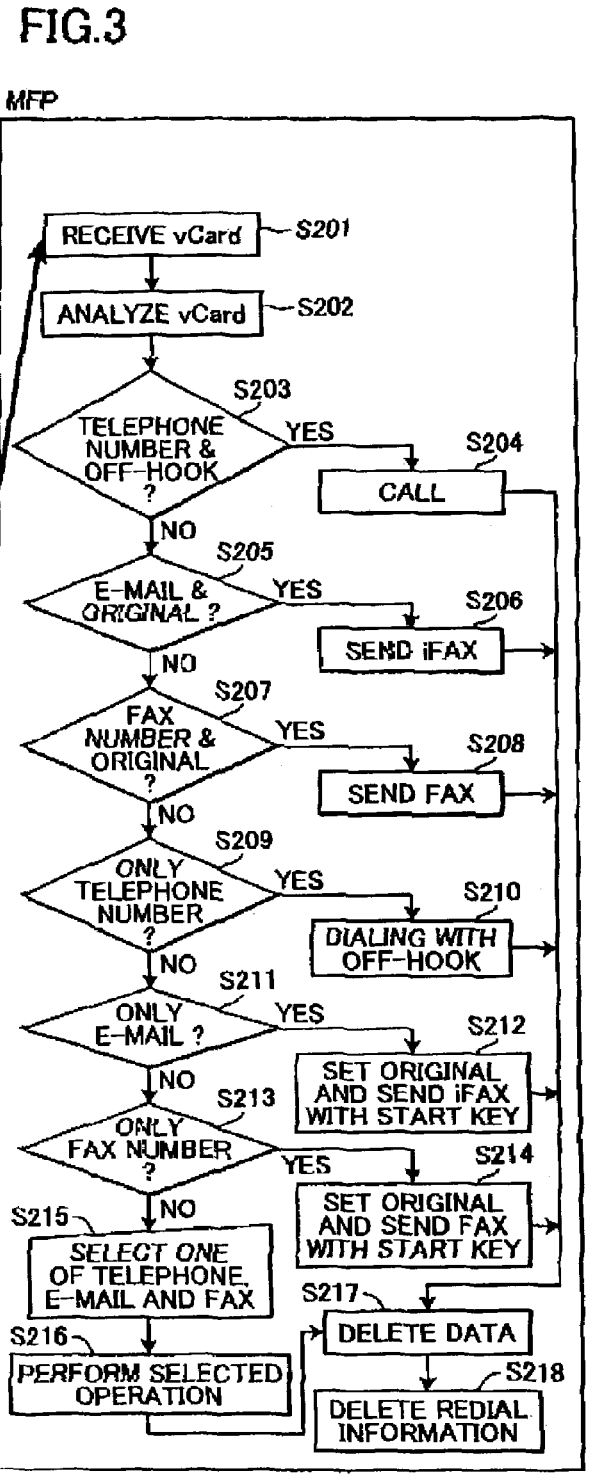
FIG.3

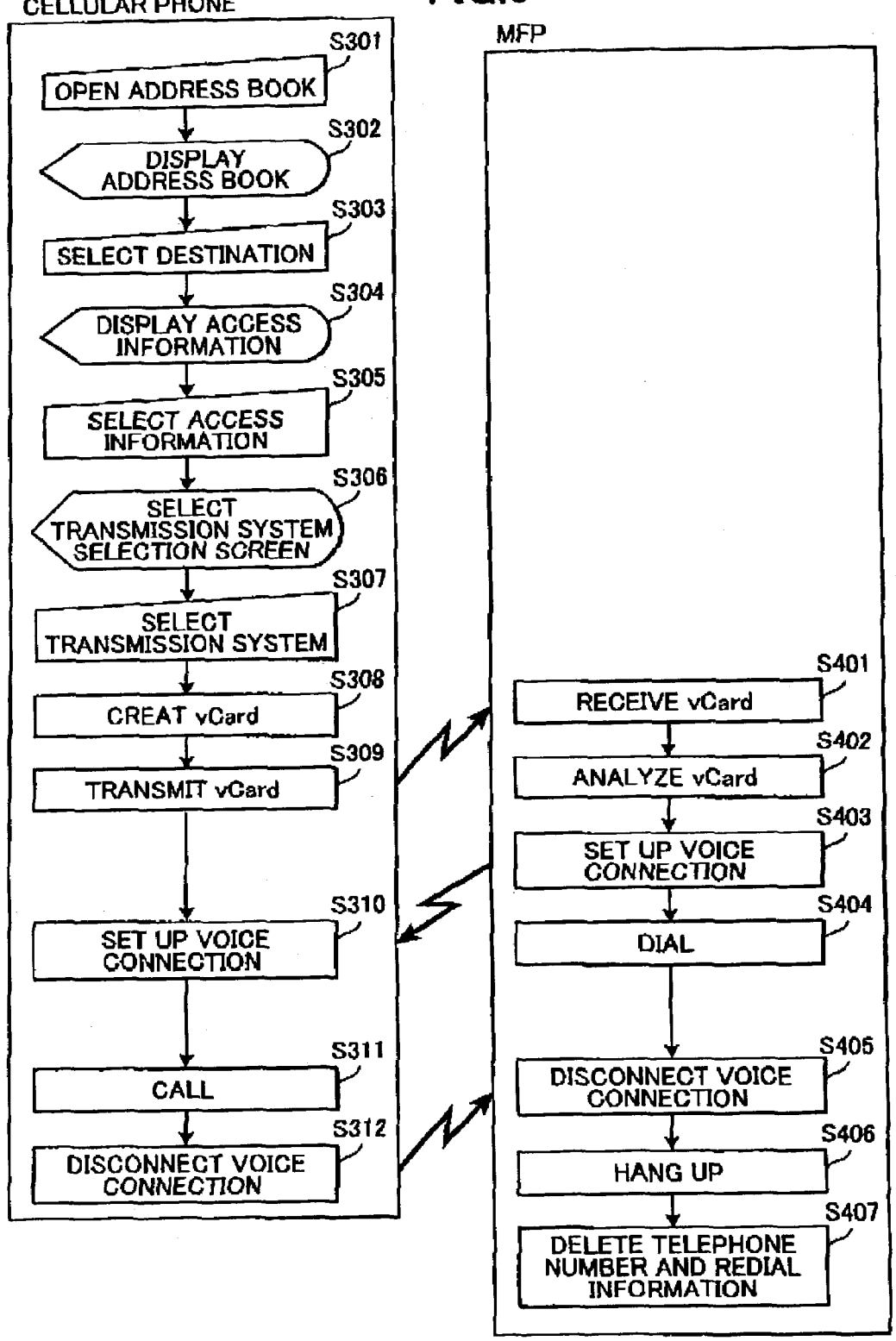

COMMUNICATION SYSTEM, AND TERMINAL DEVICE AND COMMUNICATION DEVICE USED IN COMMUNICATION SYSTEM

BACKGROUND OF THE INVENTION

1. Field of the Invention

The present invention relates to a communication system including a communication device connectable to a communication network and a terminal device capable of transmitting information to the communication device, and to the terminal device and the communication device that are provided in this communication system.

2. Description of the Prior Art

Mobile wireless portable terminal devices (which will hereinafter be simply called terminal devices) such as a cellular phone, a PHS (personal handyphone system), and a PDA (personal digital assistant) have been spread over the recent years. Each of those devices is preinstalled with a function for managing access information such as a telephone number, a FAX number, or an E-mail address. A user of such a device is able to register in an address book the access information such as the telephone number, the FAX number, or the E-mail address in such a way that these items are associated with the corresponding name. The user designates a communication destination by use of this address book, and then performs communications with the communication destination in some cases. Similarly, a multifunction peripheral (MFP) utilizing a public telephone network is preinstalled with the function for managing the access information, and the user can register on an address book the access information such as the telephone number, the FAX number, or the E-mail address, in such a way that these items are associated with the corresponding name.

When some users share the MFP with each other in office or in home, there is a fear that individual information registered in the address book might be known by other users. Avoidance of this possibility requires management of the individual information in only a system book or the address book of the personal mobile wireless portable terminal device without registering the individual information on the address book of the MFP.

Further, there is a case in which a communication cost is rather decreased by utilizing the telephone network to which the MFP is connected, depending on the communication destination. In such a case, the user might consider it as desirable that the communication is started not through the terminal device but through the MFP. In such a case, unless the address book of the MFP is registered with the access information to the communication destination, the user must input the access information to the communication destination to the MFP by oneself while searching the system book or the address book of the personal terminal device.

SUMMARY OF THE INVENTION

It is an object of the present invention to provide a communication system, a terminal device and a communication device each enabling access information stored on the terminal device to be utilized without imposing a load on a user when performing communications from the communication device.

According to an aspect of the present invention, a communication system is provided including: a communication device connectable to a communication network, and a terminal device for transmitting information to the communication device. The terminal device includes: an address book storage unit for storing an address book including a plurality of communication destinations, each of which has a name and access information to access thereto, a display unit for displaying the address book stored in the address book storage unit, a selecting unit for selecting one communication destination among the plurality of communication destinations in the address book displayed on the display unit, and a transmitting unit for transmitting access information of the selected communication destination to the communication device. The communication device includes: a receiving unit for receiving the access information transmitted from the terminal device, and a communicating unit for starting communication with the selected communication destination by using the access information when the receiving unit receives the access information from the terminal device.

According to the above-mentioned invention, the access information stored in the terminal device to access to the communication destination is transmitted to the communication device. The communication device then starts communicating with the communication destination on the basis of the access information. Therefore, when desiring the communication from the communication device, a user does not have to input the access information to access to the communication destination by oneself while searching the address book stored on the terminal device, thus reducing the user's operation load.

According to another aspect of the present invention, a communication system is provided including comprising: a communication device connectable to a communication network, and a terminal device for transmitting information to the communication device. The terminal device includes: an address book storage unit for storing an address book including a plurality of communication destinations, each of which has a name and access information to access thereto, a display unit for displaying the address book stored in the address book storage unit, a selecting unit for selecting one communication destination among the plurality of communication destinations in the address book displayed on the display unit, and a transmitting unit for transmitting access information of the selected communication destination to the communication device. The communication device includes: a receiving unit for receiving the access information transmitted from the terminal device, an instructing unit for issuing an instruction to start communication with the selected communication destination by using the access information received by the receiving unit, and a communicating unit for starting communication with the selected communication destination by using the access information received by the receiving unit when the instruction unit issues the instruction.

According to the above-mentioned invention, the access information stored in the terminal device to access to the communication destination is transmitted to the communication device. The communication device then starts communicating with the communication destination on the basis of the access information. Therefore, when desiring the communication from the communication device, a user does not have to input the access information to access to the communication destination by oneself while searching the address book stored on the terminal device, thus reducing the user's operation load.

According to another aspect of the present invention, a terminal device for transmitting information to a communication device is provided, including: an address book storage unit for storing an address book including a plurality of communication destinations, each of which has a name and access information to access thereto, a display unit for displaying the address book stored in the address book storage unit; a selecting unit for selecting one communication destination among the plurality of communication destinations in the address book displayed on the display unit; and a transmitting unit for transmitting access information of the selected communication destination to the communication device.

According to the above-mentioned invention, the access information stored in the terminal device to access to the communication destination can be transmitted to the communication device.

According to another aspect of the present invention, a communication device is provided including: a receiving unit for receiving access information of a communication destination transmitted by a terminal device; and a communicating unit for starting communication with the communication destination on the basis of the access information when the receiving unit receives the access information.

According to the above-mentioned invention, the communication device starts the communication with the communication destination on the basis of the access information contained in the information received. Therefore, it becomes unnecessary for a user to input the access information required to access the communication destination by oneself, thereby reducing the user's operation load.

According to another aspect of the present invention, a communication device is provided including: a receiving unit for receiving access information of a communication destination transmitted a the terminal device; an instructing unit for issuing an instruction to start communication with the communication destination related to the access information when the receiving unit receives the access information; and a communicating unit for starting communication with the communication destination on the basis of the access information received by the receiving unit when the instructing unit issues the instruction.

According to the above-mentioned invention, the communication device starts the communication with the communication destination on the basis of the access information contained in the information received. Therefore, it becomes unnecessary for a user to input the access information required to access to the communication destination by oneself, thereby reducing the user's operation load.

BRIEF DESCRIPTION OF THE DRAWINGS

In the accompanying drawings:

FIG. 3 is a flowchart showing an access transfer process in the communication system shown in FIG. 1;

FIG. 6 is a flowchart showing a calling process in the communication system shown in FIG. 1.

DETAILED DESCRIPTION OF PREFERRED EMBODIMENTS

Figure 1:
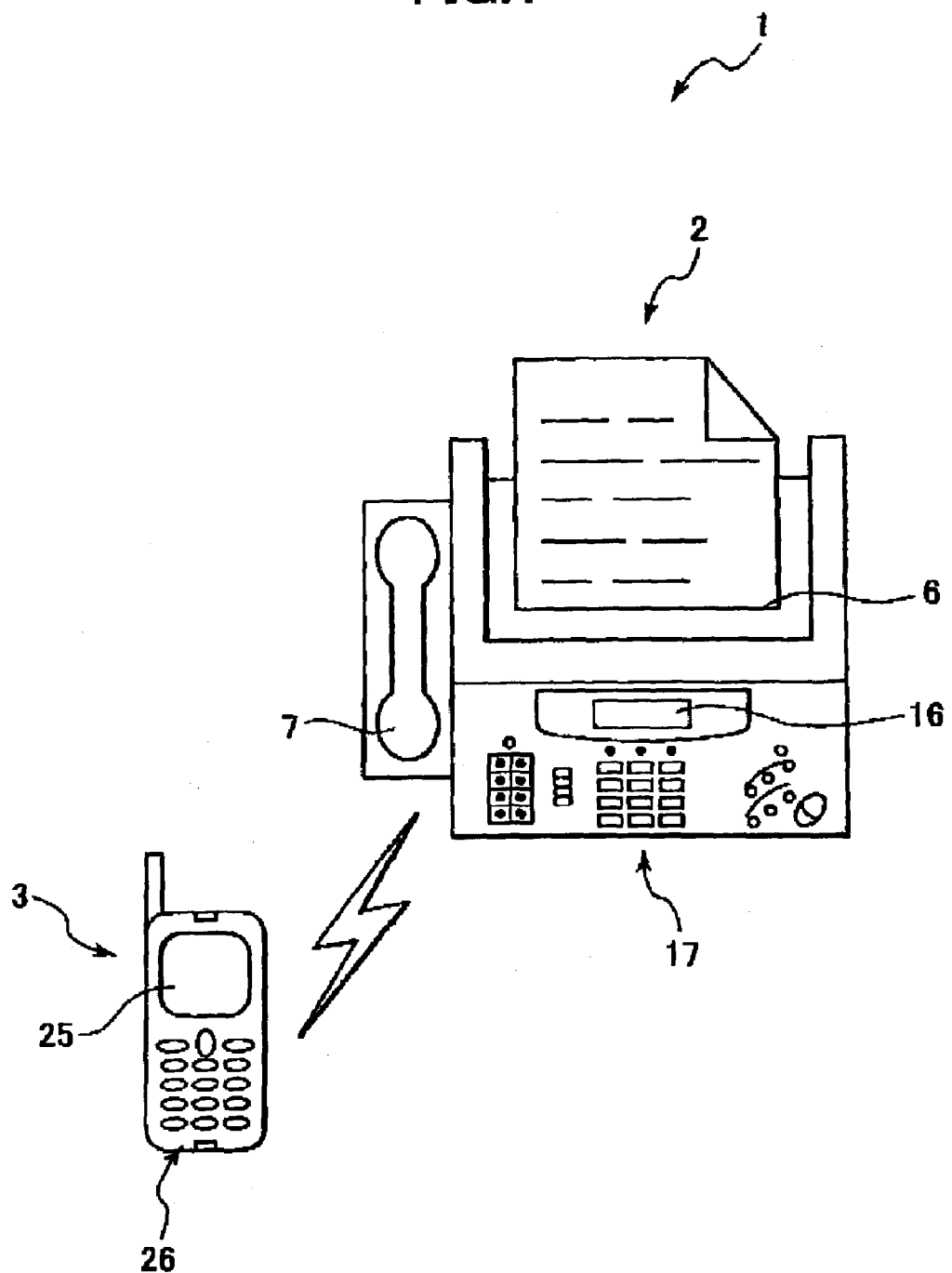
FIG. 1 is a block diagram showing a communication system in accordance with an embodiment of the present invention.

The aforementioned aspects and other features of the invention are explained in the following description, taken in connection with the accompanying drawing figures wherein:

FIG. 1 shows a communication system 1 of the first embodiment in accordance with the present invention.

As illustrated in FIG. 1, the communication system 1 includes an MFP (multifunction peripheral) 2 and a cellular phone 3. In another embodiment, a device preinstalled with an address book function such as a PHS or a PDA may be used in addition to the cellular phone 3 or instead of the cellular phone 3.

The MFP 2 is connected to a public telephone network. The MFP 2 has a telephone function for calling to a communication destination party (which will be designated as a communication destination hereinafter), a FAX function for transmitting image data to the communication destination, and an Internet FAX (iFAX) function. The MFP 2 further includes a communication module for performing communications based on a short-range wireless communication protocol (Bluetooth, IrDA, etc.). Accordingly, the MFP 2 is capable of transmitting and receiving data to and from peripheral devices such as the cellular phone 3 through the communication module.

The MFP 2 has a handset 7, a document feeder 6 for placing a document thereon, an image reading unit for scanning image on the document (not shown), and an image storage for storing image data being transmitted (not shown). It should be noted that the document feeder 6 may consist of an automatic document feeder (ADF) or a contact glass of a flat scanner. The MFP 2 also includes an off-hook detection unit for detecting whether the handset 7 is off the hook, a document detection unit for detecting whether the document is placed on the document feeder 6, and an image detecting unit for detecting whether the image storage unit stores image data.

The MFP 2 has a display unit 16 on a front surface thereof which is constructed of a liquid crystal display. The display unit 16 displays several kinds of information including a name, a telephone number, a FAX number, and an E-mail address of a communication destination. Moreover, the MFP 2 has an operating unit 17 on a front surface thereof. The operating unit 17 is provided with many keys including a start key.

The cellular phone 3 has a telephone function for calling to a communication destination. The cellular phone 3 further includes a communication module for performing communications based on the short-range wireless communication protocol similarly to the MFP 2, to transmit and receive the data to and from peripheral devices including the MFP 2.

The cellular phone 3 has a storage (not shown) for storing an address book including a lot of communication destination with a name and access information to access thereto. A display unit 25 constructed of, e.g., a liquid crystal display is disposed on a front surface of the cellular phone 3. Many kinds of information stored in an address book of the cellular phone 3 are displayed thereon. An operating unit 26 is disposed on the front surface of the cellular phone 3, and is provided with many keys.

A user is able to select a name of a communication destination from an address book (see FIG. 4A) displayed on the display unit 25, and desired access information from a lot of access information (telephone numbers, FAX numbers, and E-mail addresses) by operating the operating unit 26. Namely, the operating unit 26 performs a function as a selecting unit.

Bluetooth is a wireless transmission system utilizing a 2.4 GHz bandwidth (2.402-2.480 GHz). Bluetooth has a communication area (piconet) in a range of approximately 10 m through 100 m in which terminal devices such as the cellular phones 3 can communicate with another terminal, depending on a level of transmission outputs.

Further, IrDA is a wireless transmission system utilizing infrared-rays. IrDA enables the communications at 1.153 Mbps and 4 Mbps by using software.

The structure of the communication system 1 shown in FIG. 1 will be described referring to FIG. 2.

Figure 2:
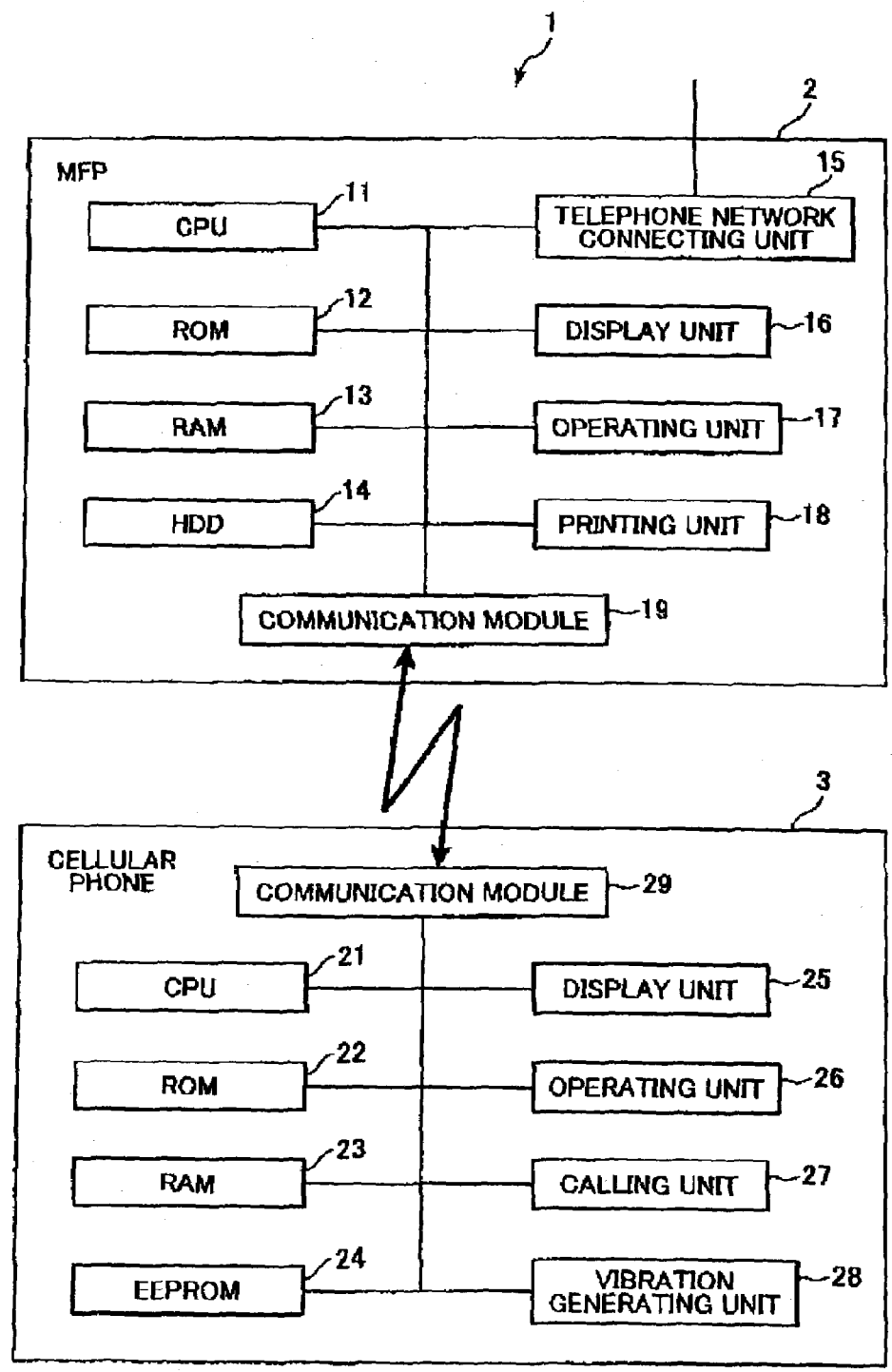
FIG. 2 is an explanatory block diagram showing the communication system shown in FIG. 1.

As shown in FIG. 2, the MFP 2 includes a CPU (central processing unit) 11, a read only memory (ROM) 12, a random access memory (RAM) 13, a hard disk drive (HDD) 14, a telephone network connection unit 15, the display unit 16, the operating unit 17, a printing unit 18, and a communication module 19.

The ROM 12 is a read-only storage device and constitutes a part of a main memory of the MFP 2. This ROM 12 stores several kinds of programs such as a program for the MFP 2 to execute an access information transfer process (see FIG. 3) for transferring the access information from the cellular phone 3 to the MFP 2.

The RAM 13 is a readable/writable volatile storage device, and constitutes a part of a main memory of the MFP 2. The RAM 13 has a work area for storing an intermediate result of a data processing.

The HDD 14 is a readable/writable storage device and a reading device thereof. The HDD 14 stores several kinds of information.

The telephone network connection unit 15 connects the MFP 2 to the public telephone network. In another embodiment, the telephone network connection unit 15 is capable of connecting the cellular phone 3 to the public telephone network via the communication module 19.

The printing unit 18 prints characters and images in monochrome or colors. This printing unit 18 prints several kinds of information when receiving FAX and iFAX.

The communication module 19 performs the wireless communications based on Bluetooth and IrDA. The wireless communications enable the MFP 2 to transmit and receive data to and from peripheral terminal devices such as the cellular phones 3. It should be note that that a Bluetooth communication module and/or an IrDA communication module are illustrated as the communication module 19 in FIG. 2.

Figure 5:
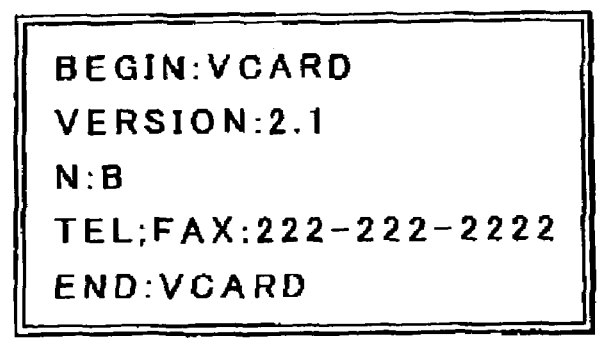
FIG. 5 is a diagram showing one example of vCard-formatted data.

The CPU 11 executes various calculations and processes, and functions as the central processing unit. The CPU 11 analyzes vCard-formatted data sent from the cellular phone 3 in the access information transfer process for transferring the access information from the cellular phone 3 to the MFP 2. The CPU 11 refers to an analysis result of the vCard-formatted data, a detection result of the off-hook detection unit, a detection result of the document detection unit, and a user's input through the operating unit 17, and then specifies one of communication methods conducted by the user among the call by the telephone function, the image data transmission to a destination by the FAX function, and an image data transmission to a destination by the iFAX function. It should be noted that the vCard format is a standard in a file format for transferring and receiving data such as that of an address book without depending on an application. FIG. 5 shows one example of vCard.

When vCard-formatted data contains a telephone number, the off-hook detection unit detects that the handset 7 is off the hook, and the communication module 19 then receives the vCard-formatted data, the CPU 11 determines that the communication method conducted by the user is the call system based on the telephone function.

When vCard-formatted data contains an E-mail address, the document detection unit detects that the document is placed on the document feeder 6, and the communication module 19 receives the vCard-formatted data, the CPU 11 determines that the communication method conducted by the user is the image data transmission system based on the iFAX function.

When vCard-formatted data contains a FAX number, the document detection unit detects that the document is placed on the document feeder 6, and the communication module 19 receives the vCard-formatted data, the CPU 11 determines that the communication method conducted by the user is the image data transmission system based on the FAX function. It should be noted that the iFAX function has a priority over the FAX function in this embodiment when the vCard-formatted data contains both of the E-mail address and the FAX number (see FIG. 3). However, the FAX function may have a priority over the iFax function in another embodiment.

As described above, the CPU 11 selects one of the telephone function, the FAX function, and the iFAX function by selecting only the communication destination without selecting the access information such as the telephone number, the FAX number and the E-mail address, thereby reducing a user's operation load.

As shown in FIG. 2, the cellular phone 3 includes a CPU 21, a ROM 22, a RAM 23, an electrically erasable programmable read only memory (EEPRM) 24, the display unit 25, the operating unit 26, a telephone calling unit 27, a vibration generating unit 28, and a communication module 29.

The ROM 22 is a read-only storage device and constitutes a part of a main memory of the cellular phone 3. This ROM 22 stores several programs such as a program for the cellular phone 3 to execute the access information transfer process (see FIG. 3) for transferring the access information from the cellular phone 3 to the MFP 2.

The RAM 23 is a readable/writable volatile storage device, and constitutes a part of a main memory of the cellular phone 3. The RAM 23 has a work area for storing an intermediate result of data processing.

The EEPROM 24 is a readable/writable storage device capable of continuously retaining the stored data even in a power-off mode. The EEPROM 24 stores several kinds of information registered in an address book. The information includes communication destinations with a name, a telephone number, a FAX number, or an E-mail address thereof.

The calling unit 27 has a voice generating device (a speaker) for generating a voice from the terminal device toward outside, and a voice input device (a microphone) for receiving an voice entering from outside to the terminal device. The calling unit 27 is used for talking with to a person of a communication destination. This calling unit 27 inputs and outputs a speaking voice during the call, and emits a calling sound for notifying the user of a call arrived when receiving the call.

The vibration generating unit 28 is constructed of an electro-mechanical converting element, and generates vibrations when an alternate current flows through the electro-mechanical converting element. When the cellular phone 3 receives a call, the vibration generating unit 28 vibrates, thereby causing vibrations of the terminal device 3 itself. Accordingly, a user can notice the call arrived. Note that the electro-mechanical converting element may generate sounds when one frequency within an audible band is utilized as a frequency of the alternate current (an electro-mechanical-acoustic converting element). The vibration generating unit 28 may be used for notifying the user of the receipt of a call by sound.

The communication module 29 performs the wireless communications based on Bluetooth and IrDA. Through the wireless communications, the cellular phone 3 is capable of transmitting and receiving the data to and from the peripheral devices such as the MFP 2. Note that the Bluetooth communication module and/or the IrDA communication module are illustrated as the communication module 29.

The CPU 21 executes various calculations and processes, and functions as the central processing unit. When the CPU 21 performs the access information transfer process for transferring the access information from the cellular phone 3 to the MFP 2, the CPU 21 controls the display unit 25 to display an address book stored in the EEPROM 24 on the display unit 25. Then, the CPU 21 selects a name designated by a user by utilizing the address book. Subsequently, the CPU 21 controls the display unit 25 to display the telephone number, the FAX number, and the E-mail address related to the selected name on the display unit 25. The CPU 21 specifies the access information (the telephone number, the FAX number and the E-mail address) designated by the user by using the content displayed on the display unit. The CPU 21 then creates vCard-formatted data containing the specified access information. The CPU 21 then instructs the communication module 29 to transmit the created vCard-formatted data.

Next, the access information transfer process for transferring the access information from the cellular phone 3 to the MFP 2 in the above communication system will be described referring to FIGS. 3 to 5.

In step S101, the user performs an operation of opening the address book by operating the operating unit 26 on the user's own cellular phone 3. At this time, the CPU 21 of the cellular phone 3 loads the data of the address book out of the EEPROM 24 in response to a command of the user's operation.

Figure 4A:
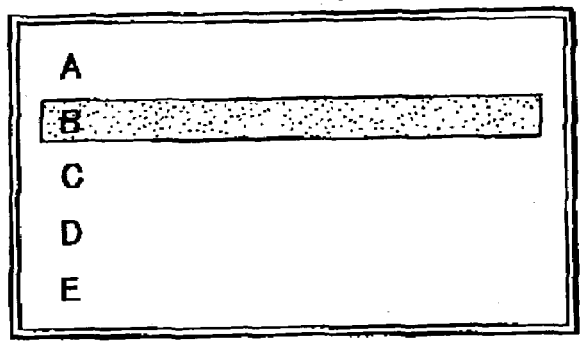
FIGS. 4A to 4C are diagrams showing display examples on a cellular phone constituting the communication system in FIG. 1.

In step S102, the CPU 21 of the cellular phone 3 controls the content displayed on the display unit 25 so that the contents of the address book are displayed on the display unit 25. The display unit 25 then displays the address book on the display unit 25 of the cellular phone 3. Through the execution of the steps S101 and S102, five names of persons such as "A", "B", "C", "D", and "E" are displayed on the display unit 25, as shown in FIG. 4A. When a name of the communication destination is selected, the selected name is displayed reversely as shown in FIG. 4A.

In step S103, the user selects a communication destination from the names displayed on the display unit 25 by operating the operating unit 26 on the cellular phone 3. At this time, the CPU 21 of the cellular phone 3 loads the data of the access information related to the name of the selected communication destination out of the EEPROM 24 in response to the user's operation.

Figure 4B:
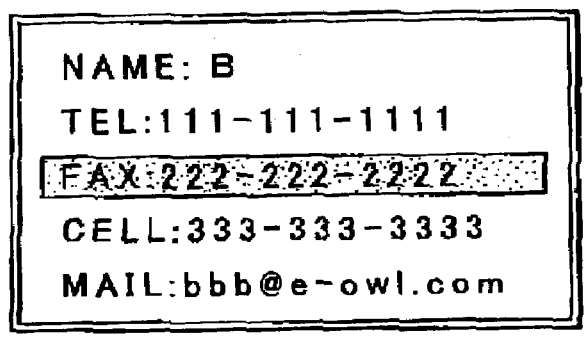

In step S104, the CPU 21 of the cellular phone 3 controls the content displayed on the display unit 25 so that the content of the access information related to the name selected by the user is displayed on the display unit 25, thereby displaying the access information related to the name designated by the user on the display unit 25 of the cellular phone 3. Through the execution of the steps S103 and S104, if the user designates "B" in FIG. 4A, the access information such as the telephone number and/or the FAX number related to the "B" is displayed on the display unit 25, as shown in FIG. 4B.

In step S105, the user selects the access information used for the communications with the communication destination among several kinds of access information displayed on the display unit 25 by operating the operating unit 26 on the cellular phone 3. At this time, the CPU 21 of the cellular phone 3 specifies one of access information based on the user's operation on the operating unit 26. Note that FIG. 4B shows an example where the user designates the FAX number.

Figure 4C:
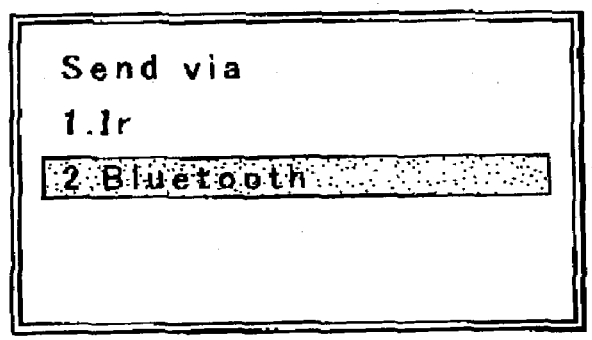

In step S106, the CPU 21 of the cellular phone 3 controls the display unit 25 so that a transmission system selection screen as in one example shown in FIG. 4C is displayed on the display unit 25, and then allows the user to select the transmission system (Bluetooth or IrDA) for transmission to the MFP 2.

In step S107, on the cellular phone 3, the user selects the transmission system utilized for transmission to the MFP 2 among several transmission systems displayed on the transmission system selection screen on the display unit 25 by operating the operating unit 26. At this time, the CPU 21 of the cellular phone 3 specifies which transmission system is used on the basis of the user's operation on the operating unit 26. Note that FIG. 4C shows an example in which the user designates Bluetooth.

In step S108, the CPU 21 of the cellular phone 3 creates vCard-formatted data containing the selected access information as shown in FIG. 5.

In step S109, the cellular phone 3 transmits the vCard-formatted data created in step S108 to the MFP 2 via the communication module 29 by the transmission method selected in step S107.

In step S201, the MFP 2 receives the vCard-formatted data transmitted by the cellular phone 3 through the communication module 19.

In step S202, the CPU 11 of the MFP 2 analyzes the vCard-formatted data received from the cellular phone 3, and temporarily saves the analysis result into the RAM 13.

In step S203, the CPU 11 of the MFP 2 determines based on the analysis result in step S202 whether the vCard-formatted data received contains a telephone number. The CPU 11 of the MFP 2 further determines based on an output of the off-hook detection unit whether the handset 7 is off the hook. In the case of determining that the telephone number is contained and that the handset is off the hook (S203: YES), the CPU 11 advances to step S204. On the other hand, if it is determined that the telephone number is not contained or that the handset is not off the hook (S203: NO), the CPU 11 moves to step S205.

In step S204, the CPU 11 of the MFP 2 determines that the telephone function be utilized, and starts communicating with the communication destination by using the telephone number. After the communication with the communication destination starts, the CPU 11 goes to step S217.

In step S205, the CPU 11 of the MFP 2 determines based on the analysis in step S202 whether the received vCard-formatted data contains an E-mail address. The CPU 11 of the MFP 2 further determines based on an output of the document detection unit whether the document is placed on the document feeder 6. In the case of determining that the E-mail address is contained and that the document is placed thereon (S205: YES), the CPU 11 advances to step S206. On the other hand, if it is determined that the E-mail address is not contained or that the document is not placed thereon (S205: NO), the CPU 11 moves to step S207.

In step S206, the CPU 11 of the MFP 2 determines that the iFAX function be utilized, and then starts converting the scanned document image to TIFF-F formatted data, attaching the TIFF-F formatted data to the E-mail address of the communication destination, and transmitting the data by use of the E-mail address to the corresponding mail-server without the user's operating the start key on the operating unit 17. After the communication with the communication destination starts, the CPU 11 goes to step S217.

In step S207, the CPU 11 of the MFP 2 determines based on the analysis in step S202 whether the vCard-formatted data received contains a FAX number. The CPU 11 of the MFP 2 further determines based on an output of the document detection unit whether the document is placed on the document feeder 6. In the case of determining that the FAX number is contained and that the document is placed thereon (S207: YES), the CPU 11 advances to step S208. On the other hand, if it is determined that the FAX number is not contained or that the document is not placed thereon (S207: NO), the CPU 11 moves to step S209.

In step S208, the CPU 11 of the MFP 2 determines that a FAX function be utilized, and then starts communicating with the communication destination by use of the FAX number without the user's operating the start key on the operating unit 17. The MFP 2 then transmits the scanned document image in accordance with a FAX transmitting procedure. If the first trial to establish the communication with the communication destination fails, the CPU 11 of the MFP 2 redials a limited number of times by using the FAX number until the communication with the communication destination is established. After the communication with the communication destination starts, the CPU 11 goes to step S217.

In step S209, the CPU 11 of the MFP 2 determines based on the analysis in step S202 whether the received vCard-formatted data contains only a telephone number (i.e., either Fax number or E-mail address is not contained). In the case of determining that only the telephone number is contained (S209: YES), the CPU 11 advances to step S210. On the other hand, if it is determined that any other information except the telephone number is contained (S209: NO), the CPU 11 moves to step S211.

In step S210, when the off-hook detection unit detects that the handset 7 is changed from on-hook to off-hook, the MFP 2 starts communicating with the communication destination by use of the telephone number. After the communication with the communication destination starts, the CPU 11 goes to step S217.

In step S211, the CPU 11 of the MFP 2 determines based on the analysis in step S202 whether the vCard-formatted data received contains only an E-mail address (i.e., either telephone number or FAX number is not contained). In the case of determining that only the E-mail address is contained (S211: YES), the CPU 11 advances to step S212. On the other hand, if it is determined that any other information except the E-mail address is contained (S211: NO), the CPU 11 moves to in step S213.

In step S212, when the document detection unit detects that the document is placed on the document feeder 6, and then the start key on the operating unit 17 is pressed, the MFP 2 starts converting the scanned document image to TIFF-F formatted data, attaching the TIFF-F formatted data to the E-mail address of the communication destination, and transmitting the data by use of the E-mail address to the corresponding mail-server. After the communication with the communication destination starts, the CPU 11 goes to step S217. In another embodiment, the MFP 2 may start the communication with the communication destination immediately after an document is place on the document feeder 6.

In step S213, the CPU 11 of the MFP 2 determines based on the analysis in step S202 whether the received vCard-formatted data contains only a FAX number (i.e., either telephone number or E-mail address is not contained). In the case of determining that only the FAX number is contained (S213: YES), the CPU 11 advances to step S214. On the other hand, if it is determined that any other information except the FAX number is contained (S211: No), the CPU 11 moves to step S213.

In step S214, when the document detection unit detects that a document is place on the document feeder 6, and the start key on the operating unit 17 is pressed, the MFP 2 starts communicating with the communication destination by use of the FAX number. The MFP 2 then transmits the scanned document image-data to the communication destination in accordance with the facsimile transmitting procedure. If the first trial to establish the communication with the communication destination fails, the CPU 11 of the MFP 2 redials a limited number of times by using the FAX number until the communication with the communication destination is established. After the communication with the communication destination starts, the CPU 11 goes to step S217. In another embodiment, the communication may also be started immediately after the document is placed on the document feeder 6.

In step S215, the CPU 11 of the MFP 2 controls the displaying unit 16 based on the analysis in step S202 so that the access information contained in the received vCard-formatted data is displayed on the display unit 16. In this case, at least two of the telephone number, the E-mail address, and the FAX number are displayed on the display unit 16. Then, the user selects the access information by operating the operating unit 17. The CPU 11 of the MFP 2 identifies the access information selected by the user on the basis of the user's operation.

In step S216, the MFP 2 starts the communication with the communication destination by use of the access information selected in step S215. If the access information selected in step S215 is FAX number, and the first trial to establish the communication with the communication destination fails, the MFP 2 redials a limited number of times by using the FAX number until the communication is established. After the communication with the communication destination starts, the CPU 11 goes to step S217.

In step S217, after the communication starts and the access information then becomes unnecessary, the CPU 11 of the MFP 2 executes a process for deleting the analysis on the access information stored in the RAM 13 in step S202, and then goes to step S218.

When the MFP 2 redials at least once in any one of steps S208, S214, and S216, the MFP 2 obtains information used for the redial such as dial history information in addition to the access information. Therefore, in step S218, the CPU 11 of the MFP 2 executes a process for deleting information used for the redial or remaining in the RAM 23 or the EEPROM 24 due to the redial.

As discussed above, the cellular phone 3 transmits the access information to access the corresponding communication destination to the communication device 2. The communication device then starts the communication with the communication destination on the basis of the received access information. Therefore, when a user desires the communication from the MFP 2, the user does not have to input the access information to access to the communication destination by oneself while searching the desired one in the address book stored on the cellular phone 3. Accordingly, the amount of the user's operation is reduced. When the cost required to communicate with a communication destination from the MFP 2 is less than the cost required to communicate from the cellular phone 3, a user is probably considered to prefer the communication from the MFP 2 to that from the cellular phone 3.

Further, the cellular phone 3 has a menu structure for a user to select one of a telephone number, a FAX number and an E-mail address. Therefore, the CPU 11 of the MFP 2 is not required to determine which access information should be used for the communication.

Moreover, when the off-hook detection unit detects that the handset 7 is off the hook, the telephone number is automatically selected even if the vCard-formatted data sent from the cellular phone 3 contains several kinds of access information.

Accordingly, the user's operation of designating the telephone number becomes unnecessary, and the amount of the user's operation is reduced.

Similarly, when the document detection unit detects that the document is placed on the board 6, the E-mail address is automatically selected even if the vCard-formatted data sent from the cellular phone 3 contains several kinds of access information. In this case, if the vCard-formatted data sent from the cellular phone 3 does not contain the E-mail address, the FAX number is selected instead of the E-mail address. Accordingly, the user's operation of designating the telephone number or the E-mail address becomes unnecessary, and the amount of the user's operation is reduced.

Further, the data transfer between the cellular phone 3 and the MFP 2 uses vCard-formatted data which is commonly used for data communication. Therefore, it is easy to develop related systems.

After the access information received by the MFP 2 becomes unnecessary after the start of the communication, the access information used for the communication with the communication destination is deleted. That is, the MFP 2 does not store any access information used for communicating with another in a waiting period except a period in which the MFP 2 is in a process for communicating with a communication destination. Accordingly, the personal information such as the telephone number and the FAX number is kept unavailable from other users.

If the MFP 2 redials at least once, and the access information and the information related to the redial such as redial history become unnecessary after the communication starts, both the access information and the redial information is deleted. Therefore, the personal information such as the telephone number and the FAX number is kept unavailable from other users.

Next, another embodiment of the present invention will be described, referring to FIG. 6. This embodiment is not a direct calling system from the MFP 2, but a calling system utilizing the public telephone network from the cellular phone 3 via the MFP 2. FIG. 6 is a flowchart showing a calling process via the MFP over the public telephone network. Note that each of the ROM 12 and the ROM 22 is stored with a program for the MFP 2 and the cellular phone 3 to execute the process.

In step S301, a user performs an operation of opening an address book in the cellular phone 3 by operating the operating unit 26. At this time, the CPU 21 of the cellular phone 3 loads data of the address book out of the EEPROM 24 in response to the content of the user's operation.

In step S302, the CPU 21 of the cellular phone 3 controls the display unit 25 to display the contents of the address book on the display unit 25. Therefore, the address book is displayed on the display unit 25 of the cellular phone 3.

In step S303, the user selects a communication destination among the list having a lot of names displayed on the display unit 25 by operating the operating unit 26 on the cellular phone 3. At this time, the CPU 21 of the cellular phone 3 loads the data of the access information related to the name of the selected communication destination out of the EEPROM 24 in accordance with the content of the user's operation.

In step S304, the CPU 21 of the cellular phone 3 controls the display unit 25 to display the content of the access information related to the name selected by the user on the display unit 25. Accordingly, the access information related to the name designated by the user is displayed on the display unit 25 of the cellular phone 3.

In step S305, the user operates the operating unit 26 on the cellular phone 3 to select the access information, i.e., the telephone number, used for the communications with the communication destination among several kinds of access information displayed on the display unit 25. At this time, the CPU 21 of the cellular phone 3 determines that the user's operation with the operating unit 26 is a selection of the telephone number.

In step S306, the CPU 21 of the cellular phone 3 controls the display unit 25 to allow the user to select the transmission system (Bluetooth and IrDA) to the MFP 2. For example, a transmission system selection screen is displayed on the display unit 25, as shown in FIG. 4C.

In step S307, the user operates the operating unit 26 on the cellular phone 3 to select the transmission system utilized for transmission to and reception from the MFP 2 among several transmission systems displayed on the transmission system selection screen displayed on the display unit 25. At this time, the CPU 21 of the cellular phone 3 determines which transmission system is used on the basis of the user's operation on the operating unit 26.

In step S308, the CPU 21 of the cellular phone 3 creates vCard-formatted data containing the telephone number of a communication destination, as shown in FIG. 5.

In step S309, the cellular phone 3 transmits the vCard-formatted data created in step S308 to the MFP 2 via the communication module 29 by the transmission system selected in step S307.

In step S401, the MFP 2 receives the vCard-formatted data transmitted form the cellular phone 3 by the communication module 19.

In step S402, the CPU 11 of the MFP 2 analyzes the vCard-formatted data received from the cellular phone 3, and determines that the vCard-formatted data contains the telephone number.

In step S403, the MFP 2 establishes a voice connection with the cellular phone 3. Simultaneously, the cellular phone 3 establishes the voice connection with the MFP 2 in step S310.

In step S404, the MFP 2 dials to the communication destination via the telephone network connection unit 15 and the public telephone network by use of the telephone number contained in the vCard-formatted data received from the cellular phone 3.

In step S311, the cellular phone 3 transmits and receives the voice data to and from the MFP 2. At this time, the user utilizing the cellular phone 3 is communicating with the communication destination, utilizing the public telephone network via the calling unit 27 and the MFP 2.

In step S312, the cellular phone 3 disconnects the voice connection with the MFP 2. Simultaneously, the MFP 2 disconnects the voice connection with the cellular phone 3 in step S405.

In step S406, the MFP 2 disconnects the voice connection with the communication destination, and then goes to step S407.

In step S407, the CPU 11 of the MFP 2 executes a process for deleting access information received from the cellular phone 3.

As described above, when calling to the communication destination by utilizing the cellular phone 3, a user can talk with a person of the communication destination by use of the public telephone network via the MFP 2. Therefore, the user can make a call from the cellular phone 3 through the MFP 2 and the public telephone network to the communication destination without moving to a location where the MFP 2 is installed. In addition, the above system according to the present invention is effective, when a charge of the call utilizing the public telephone network is less than that of the call through other communication network.

The preferred embodiments of the present invention have been described above. The present invention is, however, not limited to the embodiment described above. Many modifications and changes are within the scope of the appended claims. For example, when the vCard-formatted data contains the telephone number and the off-hook detection unit detects that the handset 7 is off the hook after the vCard-formatted data is received, the MFP 2 determines that the communication system conducted by the user is a call based on the telephone function.

Further, when the vCard-formatted data contains the E-mail address, and the document detection unit detects that the document is placed on the document feeder 6 after the vCard-formatted data is received, the communication system conducted by the user is an image data transmission system based on the iFAX function.

Similarly, when the vCard-formatted data contains the FAX number and the document detection unit detects that the document is placed on the document feeder 6 after the vCard-formatted data is received, the communication method conducted by the user is an image data transmission system based on the FAX function.

Moreover, the access information may contain an IP address or a URL (uniform resource locator).

When an IP address is used as access information, the MFP 2 receiving the IP address from the cellular phone 3 may perform the communication with a device designated by the IP address, and establish the connection with the device. In this case, the IP address has the same role as the telephone number described above.

Further, when the URL is used as the access information, the MFP 2 receiving the URL from the cellular phone 3 may perform communication with a Web server designated by the URL, and acquire information (a Web page) designated by the URL. Simultaneously, the printing unit 18 of the MFP 20 may print the acquired Web page.

Furthermore, in the embodiments described above, instead of the document detection unit determining whether the document is placed on the document feeder, the MFP 2 may have another detection unit for determining whether the HDD 14 stores the image data for FAX transmission (such as the image data transmitted from a PC (not shown) to the MFC and the image data scanned by a scanner). In this case, the same effect as the effect generated by the structure for detecting whether the document exists is obtained.

As described above, when a user of a cellular phone according to the present invention tries to communicate through a communication device with a communication destination selected among an address book stored in the cellular phone, the user does not have to input access information related to the communication destination to the communication device. Without inputting the access information to the communication device, the cellular phone of the user can establish the connection with the communication destination through the communication device.

The system and device according to the present invention use telephone numbers, FAX numbers, and E-mail addresses which are commonly used for communication. Therefore, the system and device of the present invention is easily available for use with widespread communication devices.

A user can select one of several kinds of access information to access to the communication destination displayed on the cellular phone. Therefore, the communication device receives only one kind of access information. Even if the communication device receives a few kinds of access information, the communication device determines an access system, depending on the detection results of the off-hook detection unit and the document detection unit.

It is understood that the foregoing description and accompanying drawings set forth the preferred embodiments of the invention at the present time. Various modifications, additions and alternative designs will, of course, become apparent to those skilled in the art in light of the foregoing teachings without departing from the spirit and scope of the disclosed invention. Thus, it should be appreciated that the invention is not limited to the disclosed embodiments but may be practiced within the full scope of the appended claims.

What is claimed is:

1. A communication system comprising:
a communication device connectable to a communication network, and a terminal device for transmitting information to the communication device, wherein
the terminal device comprises:
an address book storage unit for storing an address book including a plurality of communication destinations, each of the plurality of communication destinations having a name and access information to access thereto,
a display unit for displaying the address book stored in the address book storage unit,
a selecting unit for selecting one communication destination among the plurality of communication destinations in the address book displayed on the display unit, and
a transmitting unit for transmitting access information of the selected communication destination to the communication device, and wherein
the communication device comprises:
a receiving unit for receiving the access information transmitted from the terminal device,
an analyzing unit for analyzing the access information to detect a plurality of modes for communicating with the selected communication destination, the analyzing unit selecting one mode of communication from the plurality of modes for communicating; and
a communicating unit for starting communication with the selected communication destination using the selected mode of the plurality of modes for communicating with the selected communication destination when the receiving unit receives the access information from the terminal device,
wherein the plurality of modes for communicating with the selected destination comprises at least two of a telephone number, a FAX number, an IP address, and an e-mail address.

2. The communication system according to claim 1, wherein the access information includes at least one of telephone access information for calling to the corresponding communication destination and FAX access information for transmitting image information to the corresponding communication destination.

3. The communication system according to claim 2, wherein the selecting unit selects one of the telephone access information and the FAX access information to be transmitted by the transmitting unit to the communication device.

4. The communication system according to claim 2, wherein the communication device further comprises:
a handset,
an off-hook detecting unit for detecting whether the handset is off the hook, and
a determining unit that determines that the communicating unit communicates with the selected communication destination by using the telephone access information in the access information after the access information is received by the receiving unit from the terminal device and the off-hook detecting unit detects that the handset is off the hook, or when the off-hook detecting unit detects that the handset is off the hook after the receiving unit receives the access information from the terminal device.

5. The communication system according to claim 2, wherein the communication device further comprises:
   a document placing unit that places a document thereon,
   an image data storage unit that stores image data to be transmitted by facsimile,
   a detecting unit that detects whether a document is placed on the document placing unit and whether image data is stored in the image data storage unit, and
   a determining unit that determines that the communication unit communicates with the selected communication destination by using the FAX information in the access information after the access information is received by the receiving unit from the terminal device and the detecting unit detects one of that the document is placed on the document placing unit and that the image data is stored in the image data storage unit, or when the detecting unit detects one of that the document is placed on the document placing unit and that the image data is stored in the image data storage unit after the receiving unit receives the access information from the terminal device.

6. The communication system according to claim 1, wherein the access information transmitted from the transmitting unit of the terminal device to the receiving unit of the communication device has a data format of vCard.

7. The communication system according to claim 1, wherein the terminal device communicates with another communication device of the communication destination connected to the communication network through the communication device and the communication network to which the communication device is connected.

8. The communication system according to claim 1, wherein the communication device further comprises:
   a deleting unit that deletes the access information received by the receiving unit after the communicating unit starts the communication and the access information becomes unnecessary.

9. The communication system according to claim 1, wherein the communicating unit further includes:
   a redialing unit that redials by using the access information, wherein the deleting unit deletes the access information used by the redialing unit when the communication with the selected communication destination is established.

10. A communication system comprising:
    a communication device connectable to a communication network, and a terminal device that transmits information to the communication device, wherein
    the terminal device comprises:
       an address book storage unit that stores an address book including a plurality of communication destinations, each of the plurality of communication destinations having a name and access information to access thereto,
       a display unit that displays the address book stored in the address book storage unit,
       a selecting unit that selects one communication destination among the plurality of communication destinations in the address book displayed on the display unit, and
       a transmitting unit that transmits access information of the selected communication destination to the communication device, and wherein
    the communication device comprises:
       a receiving unit that receives the access information transmitted from the terminal device,
       an analyzing unit that analyzes the access information to detect a plurality of modes for communicating with the selected communication destination and selecting one mode of communication from the plurality of modes for communicating; and
       an instructing unit that issues an instruction to start communication with the selected communication destination by using the access information received by the receiving unit, and
       a communicating unit that starts communication with the selected communication destination using the one mode of the plurality of modes for communicating with the selected communication destination detected by the analyzing unit, when the instruction unit issues the instruction,
    wherein the plurality of modes for communicating with the selected destination comprises at least two of a telephone number, a FAX number, an IP address, and an e-mail address.

11. The communication system according to claim 10, wherein the access information includes at least one of telephone access information for calling to the corresponding communication destination and FAX access information for transmitting image information to the corresponding communication destination.

12. The communication system according to claim 11, wherein the selecting unit selects one of the telephone access information and the FAX access information to be transmitted by the transmitting unit to the communication device.

13. The communication system according to claim 11, wherein the communication device further comprises:
    a handset,
    an off-hook detecting unit that detects whether the handset is off the hook, and
    a determining unit that determines that the communicating unit communicates with the selected communication destination by using the telephone access information in the access information after the access information is received by the receiving unit from the terminal device and the off-hook detecting unit detects that the handset is off the hook, or when the off-hook detecting unit detects that the handset is off the hook after the receiving unit receives the access information from the terminal device.

14. The communication system according to claim 11, wherein the communication device further comprises:
    a document placing unit that places a document thereon,
    an image data storage unit that stores image data to be transmitted by facsimile,
    a detecting unit that detects whether a document is placed on the document placing unit and whether image data is stored in the image data storage unit, and
    a determining unit that determines that the communication unit communicates with the selected communication destination by using the FAX information in the access information after the access information is received by the receiving unit from the terminal device and the detecting unit detects one of that the document is placed on the document placing unit and that the image data is stored in the image data storage unit, or when the detecting unit detects one of that the document is placed on the document placing unit and that the image data is stored in the image data storage unit after the receiving unit receives the access information from the terminal device.

15. The communication system according to claim 10, wherein the access information transmitted from the transmitting unit of the terminal device to the receiving unit of the communication device has a data format of vCard.

16. The communication system according to claim 10, wherein the terminal device is capable of communicating with another communication device of the communication destination connected to the communication network through the communication device and the communication network to which the communication device is connected.

17. The communication system according to claim 10, wherein the communication device further comprises:
a deleting unit that deletes the access information received by the receiving unit after the communicating unit starts the communication and the access information becomes unnecessary.

18. The communication system according to claim 10, wherein the communicating unit further includes:
a redialing unit that redials by using the access information, wherein the deleting unit deletes the access information used by the redialing unit when the communication with the selected communication destination is established.

19. A communication device comprising:
a receiving unit that receives access information of a communication destination transmitted by a terminal device;
an analyzing unit that analyzes the access information and capable of detecting a plurality of modes for communicating with the communication destination and selects one mode of communication from the plurality of modes for communicating; and
a communicating unit that starts communication with the communication destination using the one mode of the plurality of modes for communicating with the selected communication destination detected by the analyzing unit, when the receiving unit receives the access information transmitted by the terminal device in the one mode,
wherein the plurality of modes for communicating with the selected destination comprises at least two of a telephone number, a FAX number, an IP address, and an e-mail address.

20. The communication device according to claim 19, further comprising:
a redialing unit that redials by using the access information, and
a deleting unit that deletes redial information generated by the redial of the redialing unit when the communication with the communication destination is established.

21. A communication device comprising:
a receiving unit that receives access information of a communication destination transmitted by a terminal device;
an instructing unit that issues an instruction to start communication with the communication destination related to the access information when the receiving unit receives the access information;
an analyzing unit that analyzes the access information to detect a plurality of modes for communicating with the communication destination and selects one mode of communication from the plurality of modes for communicating; and
a communicating unit that starts communication with the communication destination by using the one mode of the plurality of modes with the communication destination detected by the analyzing unit, when the instructing unit issues the instruction,
wherein the plurality of modes for communicating with the selected destination comprises at least two of a telephone number, a FAX number, an IP address, and an e-mail address.

22. The communication device according to claim 21, further comprising:
a redialing unit that redials by using the access information, and
a deleting unit that deletes redial information generated by the redial of the redialing unit when the communication with the communication destination is established.

* * * * *